(12) United States Patent
Metrick

(10) Patent No.: US 6,654,691 B2
(45) Date of Patent: Nov. 25, 2003

(54) WELL-LOG PRESENTATION, SOFTWARE AND METHOD THEREOF

(75) Inventor: Lee B. Metrick, Austin, TX (US)

(73) Assignee: Schlumberger Technology Corporation, Austin, TX (US)

(*) Notice: Subject to any disclaimer, the term of this patent is extended or adjusted under 35 U.S.C. 154(b) by 22 days.

(21) Appl. No.: 10/068,915

(22) Filed: Feb. 8, 2002

(65) Prior Publication Data

US 2003/0154029 A1 Aug. 14, 2003

(51) Int. Cl.[7] .................................................. G06F 19/00
(52) U.S. Cl. ............................................................ 702/6
(58) Field of Search .............................. 702/6, 7, 9, 10, 702/16; 367/73, 70, 35; 703/10; 175/45, 50

(56) References Cited

U.S. PATENT DOCUMENTS

| | | | | |
|---|---|---|---|---|
| 5,193,628 A | * | 3/1993 | Hill et al. ...................... 175/45 |
| 5,435,069 A | * | 7/1995 | Nicholson .................... 702/10 |
| 5,680,906 A | * | 10/1997 | Andrieux et al. .............. 175/45 |
| 5,995,446 A | * | 11/1999 | Meyer et al. .................. 367/35 |
| 6,073,079 A | * | 6/2000 | Thomas .......................... 702/9 |
| 6,078,867 A | * | 6/2000 | Plumb et al. .................... 702/6 |
| 6,095,260 A | * | 8/2000 | Mercer et al. ................. 175/45 |
| 6,389,360 B1 | * | 5/2002 | Alft et al. ....................... 702/9 |

* cited by examiner

*Primary Examiner*—Donald E. McElheny, Jr.
(74) *Attorney, Agent, or Firm*—Pehr B. Jansson; William Batzer; John J. Ryberg

(57) ABSTRACT

A well-log display (160) having a principle axis (135) matched to a deviation of a section of a well-bore (450) is disclosed. By presenting a well-log (160) at about the same angle as the section of the well-bore under consideration, a person viewing the well-log (160) will have the advantage of easily visualizing the inclination of the well-bore (450) to aid in geo-steering, proper interpretation of well-bore measurements, etc. Such a well-log (160) may be presented as a hardcopy or as an interactive display on a computer screen (642). A presentation (100, 200) of a well-log (160) may include more than just the log itself, for example, a reference diagram (100, 200) of the entire well highlighting (130) or otherwise indicating the part of the well currently being displayed in the well-log.

20 Claims, 6 Drawing Sheets

WELL-LOG PRESENTATION, SOFTWARE AND METHOD THEREOF

FIELD OF THE DISCLOSURE

The present invention relates generally to well-logs, and more particularly to the presentation of well-logs for deviated well-bores.

BACKGROUND

In order to make the most effective use of a well-log for interpretation, geo-steering, or similar purposes, a driller, geologist, petrophysicist, or other professional must be able to correlate the measurements displayed on the well-log to geological features through which the well-bore is drilled. Historically, many wells have been drilled vertically; consequently, well-logs are often presented along a single, fixed vertical axis with measurements from the shallower portion of the well being shown at the top of the well-log and measurements from the deeper portions of the well being shown at the bottom. Well-logs presented along a fixed vertical axis allow the person viewing the log to easily correlate well-bore measurements to geological features in vertical wells.

However, many modern wells deviate significantly from the vertical. Non-vertical well bores complicate well-log interpretation, because the readings of many well-logging tools are affected by the angle of inclination. Because some tool measurements differ between a vertical well and a deviated well, it is important to know how much the well-bore deviates from the vertical if one is to properly interpret the well-log. Since vertical logs generally do not provide easy to interpret visual clues concerning the inclination/deviation of a well-bore, traditional well log presentations may not be ideal for assisting someone in properly interpreting a well-log from a deviated well.

An extreme example of a well deviating from the vertical is found in horizontal wells. In horizontal wells, the well-bore may be drilled vertically until a desired depth is reached, after which time the well is purposely deviated to achieve a near horizontal direction. In order to assist users in visualizing the well-bore, the well-log has sometimes been presented along a single, fixed horizontal axis, in much the same way that the well-log for a vertical well is presented along a single, fixed vertical axis.

Since most conventional well-logs are presented along either a horizontal axis or a vertical axis that is chosen and fixed for the entire well-bore, neither a geologist interpreting the well-log nor the driller attempting to properly steer the drill-bit has an easily interpreted aid to assist him in visualizing deviations of the well-bore from the chosen vertical or horizontal presentation axis. Because this lack of visual aid can make it unnecessarily difficult to interpret a well-log of a deviated well, it would be desirable to have available alternative well-log presentation formats.

BRIEF DESCRIPTION OF THE DRAWINGS

Various display objects, advantages, features and characteristics of the present invention, as well as methods, operation and functions of related elements, will become apparent upon consideration of the following description and claims with reference to the accompanying drawings (not to scale), all of which form a part of this specification.

DETAILED DESCRIPTION OF THE FIGURES

FIGS. 1–6 illustrate various embodiments of a well-log display having a principle axis matched to an inclination of a section of a well-bore, and an information handling system for use in generating such well-log displays. Presenting a well-log of a particular section of a well-bore at about the same angle as the angle of the well-bore allows a person viewing the log to easily visualize the inclination of the well-bore to aid in proper geo-steering, interpretation of well-bore measurements, etc. The well-log can be printed, displayed interactively on a computer screen or other display device, or presented in any other suitable manner. The well-log presentation may include more than just the log itself. For example, a two dimensional or three dimensional reference diagram of a well can be used to provide a sense of which part of the well-bore is currently being displayed in the well-log. In addition, various portions of the well-log presentation can take advantage of user interaction technologies known to those skilled in the art.

Figure 1:
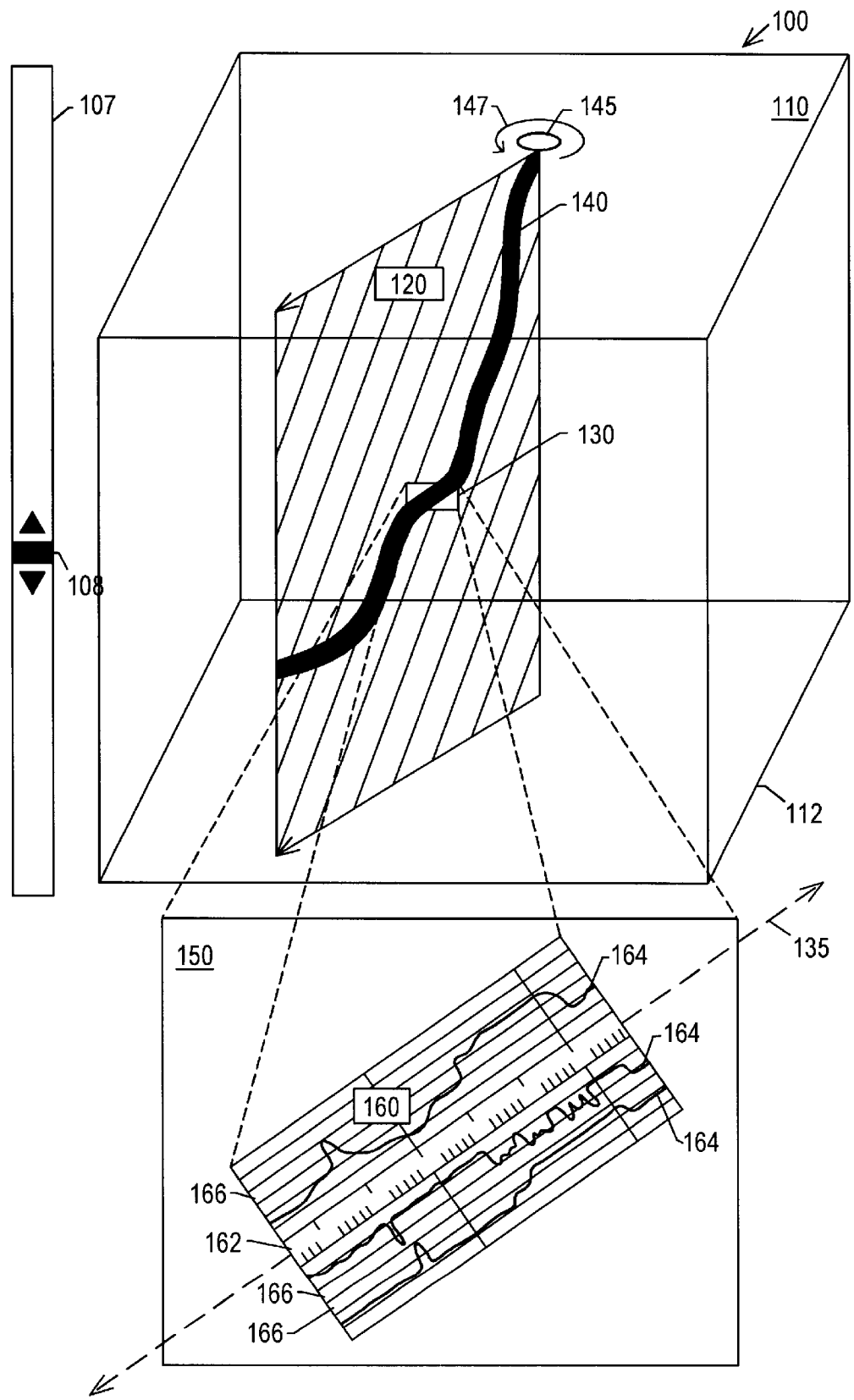
FIG. 1 is a diagram of a well-log presentation including a well-log and a three dimensional reference frame, according to one embodiment of the present invention.

Referring first to FIG. 1, a well-log presentation is illustrated according to one embodiment, and designated generally as log presentation 100. Log presentation 100, as shown, includes well diagram 110, which provides a three dimensional positional reference; log display area 150, for displaying well log 160; and scroll bar 107, which provides interactive user input to affect various display parameters of log presentation 100. In at least one embodiment, log presentation 100 is displayed on a screen coupled to an information handling system (FIG. 6), although log presentation 100 may also be presented in another format such as a hardcopy printout, a projection medium, a film type medium, or the like.

In the illustrated embodiment, well diagram 110 includes a three-dimensional reference frame, such as wire frame 112, to provide a spatial reference for well-bore projection 140, projection plane 120 and wellhead indicator 145. Being able to envision well-bore projection 140 at a particular location within wire frame 112 can help a user keep the measurements shown in log display area 150 in proper perspective. Wellhead indicator 145 serves as a starting reference around which wire frame 112 may be constructed, and at which well-bore projection 140 begins.

Projection plane 120 is, in one embodiment, a vertical plane including a line drawn vertically downward from wellhead indicator 145, and a line drawn between two points along a representation of the well-bore. Projection plane 120 is by no means limited by the above definition, and any suitable projection plane may be employed consistent with the teachings set forth herein. Onto projection plane 120, an image of the actual well-bore is projected, thereby forming well-bore projection 140. Well-bore projection 140, in combination with indicator 130, enables a user to form an intuitive perception about which part of the well-bore is being displayed in log display area 150.

Plane selector 147 may be used to allow a user to interactively select a desired projection plane. In one embodiment, a user may rotate plane selector 147 to change the orientation of projection plane 120 as desired. In other embodiments, projection plane 120 may be chosen automatically based on an inclination/deviation and well azimuth of the well-bore being projected onto projection plane 120. Ideally, a projection plane will be chosen such that the inclination/deviation of the actual well-bore will be accurately reflected by the inclination/deviation of well-bore projection 140. Various methods of selecting a projection plane will be discussed subsequently with reference to FIG. 4.

It should also be noted that the use of projection plane 120 is not required in all embodiments. For example, well-bore projection 140 may not be a projection of a well-bore onto an artificially constructed plane, but instead well-bore projection 140 may be constructed based on inclination and azimuth measurements collected by various well-bore measurement techniques known to those skilled in the art. After collection of the information necessary to locate the well-bore in three dimensional space, well-bore projection 140 may be constructed and displayed inside of wire frame 112.

In at least one embodiment, scroll bar 107 is used to provide interactive user input. For example, a user can cause indicator 130 to traverse well-bore projection 140 by moving slide 108 up or down scroll bar 107. As indicator 130 moves to different positions, the section of the well-bore for which measurements are displayed in log display area 150 changes to match the section of the well-bore highlighted by indicator 130. It will be appreciated that although scroll bar 107 is the illustrated method of interacting with indicator 130, other suitable methods of moving indicator 130 may be employed. For example indicator 130 may be moved by keyboard commands, "dragging" indicator 130 using a mouse, and the like.

Log display area 150 includes well-log 160, which has a principle axis, such as axis 135, matching the inclination of the section of the well-bore highlighted by indicator 130. Selection of the principle axis will be discussed subsequently with respect to FIG. 5. Well-log 160 typically includes a number of tracks, such as depth-track 162, and plot tracks 166 in which data curves 164 representing well-bore measurements are displayed. The angle at which well-log 160 is presented varies according to the inclination/deviation of the well-bore, such as may be represented by well-bore projection 140. For example if the section of the well-bore being displayed is nearly vertical, then well-log 160 will be presented with a nearly vertical primary axis. Conversely, if the section of the well-bore being displayed is nearly horizontal, then the primary axis of well-log 160 will also be nearly horizontal. If a section of the well-bore is deviated from the horizontal or vertical, the primary axis of well-log 160 will be matched to that deviation.

It will be appreciated that although both log display area 150 and well-log 160 are shown as rectangular areas, they are not so constrained. For example, one or both of display area 150 and well-log 160 may be circular or some other shape desirable to enhance the utility or appearance of log presentation 100. However, in at least one embodiment where log display area 150 and well-log 160 are rectangular, well-log 160 is smaller than log display area 150 by an amount corresponding to the aspect ratio of the display area, for example 0.707 for many popular display devices, to ensure that no part of the well log is cut off when the primary axis is rotated. This can be accomplished by increasing the size of display area 150, or decreasing the size of well-log 160.

Figure 2:
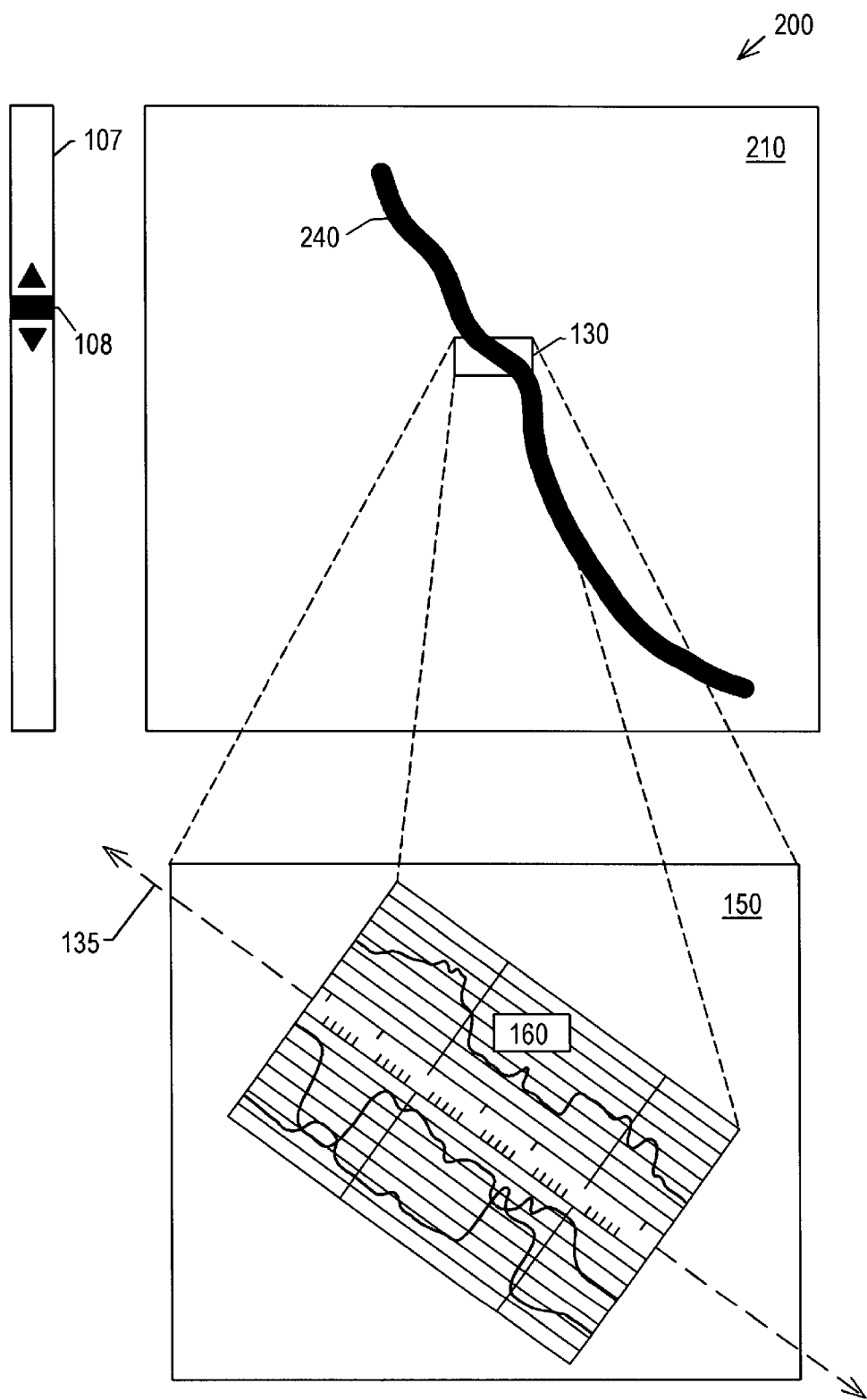
FIG. 2 is an illustration of a well-log presentation including a well-log and a two dimensional reference diagram, according to one embodiment of the present invention.

Referring now to FIG. 2, another embodiment of a well-log presentation is shown, and designated generally as second log presentation 200. Second log presentation 200 illustrates a well-log presentation including log display area 150 for displaying well log 160 with a primary axis 135 matched to the section on the well-bore being displayed, scroll bar 107 with slide 108 for accepting user input, and two dimensional well-diagram 210. Two-dimensional well-diagram 210 includes second well-bore projection 240, and indicator 130. Two-dimensional well-diagram 210 serves essentially the same function as the three dimensional well diagram 110 (FIG. 1), with indicator 130 highlighting the portion of the well-bore displayed in log display area 150. However, the simplicity of a two dimensional diagram, such as well-diagram 210, may be desirable in some instances for its aesthetic or computational simplicity. As with well-bore projection 140, second well-bore projection 240 may be a projection onto a plane that is user selectable or otherwise, or may instead be constructed directly from inclination/deviation and azimuth information.

Figure 3:
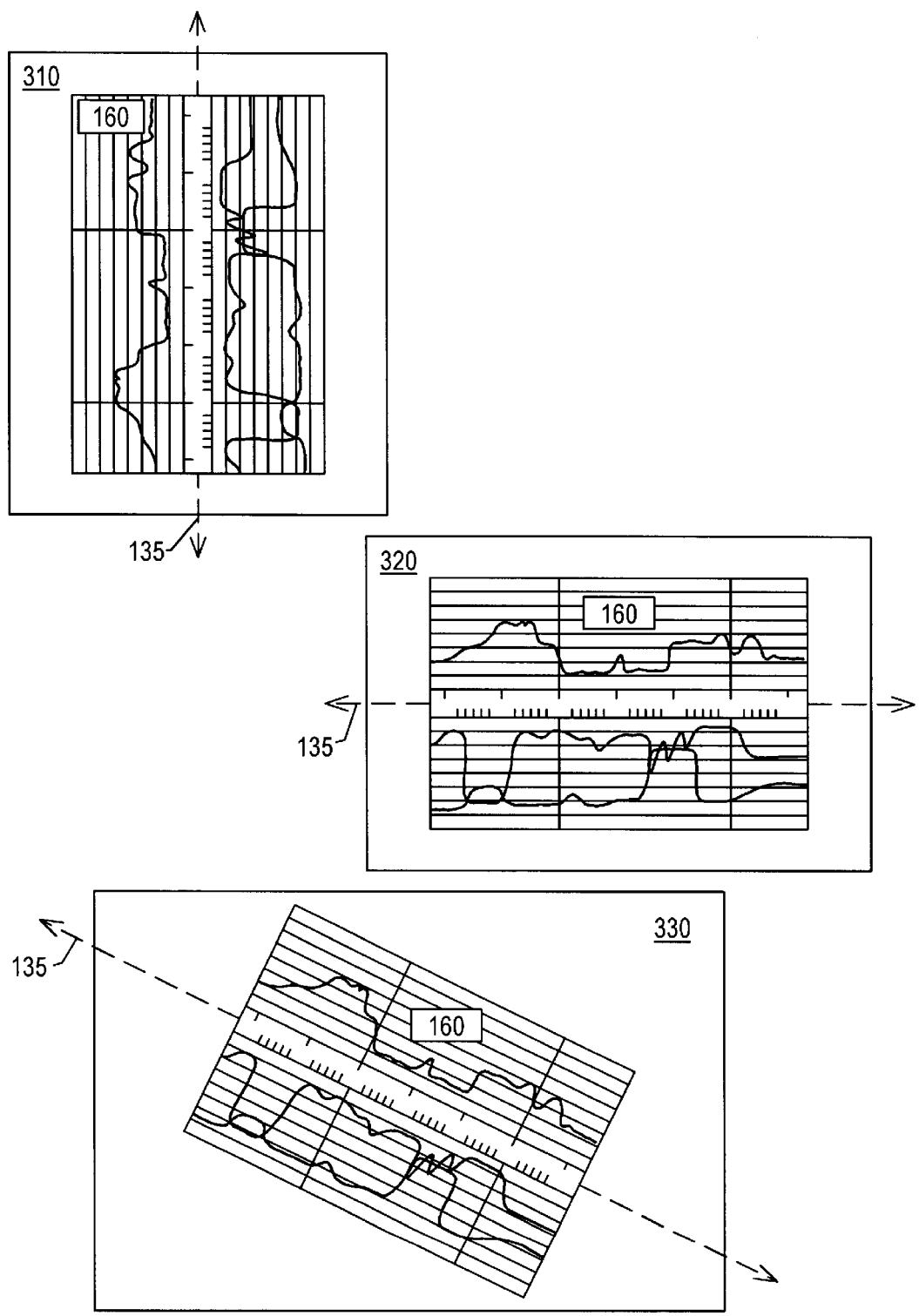
FIG. 3 is a diagram showing three well-logs, each having a different primary axis, according to an embodiment of the present invention.

Referring next to FIG. 3, three log-display areas having well-logs with different primary axes 135 are shown according to one embodiment of the present invention. Vertical log-display area 310 illustrates a well-log, such as well-log 160, having a vertical primary axis. Vertical log-display area 310 is an example of how well-log 160 might be displayed for a vertical section of well-bore. Over vertical sections of a well, vertical log-display 310 may be similar or identical to conventional vertically displayed logs.

Horizontal log-display 320 illustrates how an embodiment of the present invention can display well-log 160 over horizontal sections of a well. Note that primary axis 135 is substantially horizontal, thereby matching the inclination/deviation of the section of the well-bore being displayed in horizontal log-display 320. In a similar manner, inclined log-display 330 has a primary axis 135 that matches the inclination of a section of well-bore that is inclined at approximately 45 degrees from the vertical.

FIG. 3 serves to illustrate an advantage of being able to present well-logs of different sections of a single well-bore at angles matched to the inclination/deviation of those sections. It will be apparent upon consideration of the three different primary axes 135 used for presenting each of the well-logs 160, that a person analyzing these well-logs should find it easier to correlate the well-logs to the actual inclination of various sections of the well-bore than would be the case if viewing fixed vertical or horizontal logs.

Figure 4:
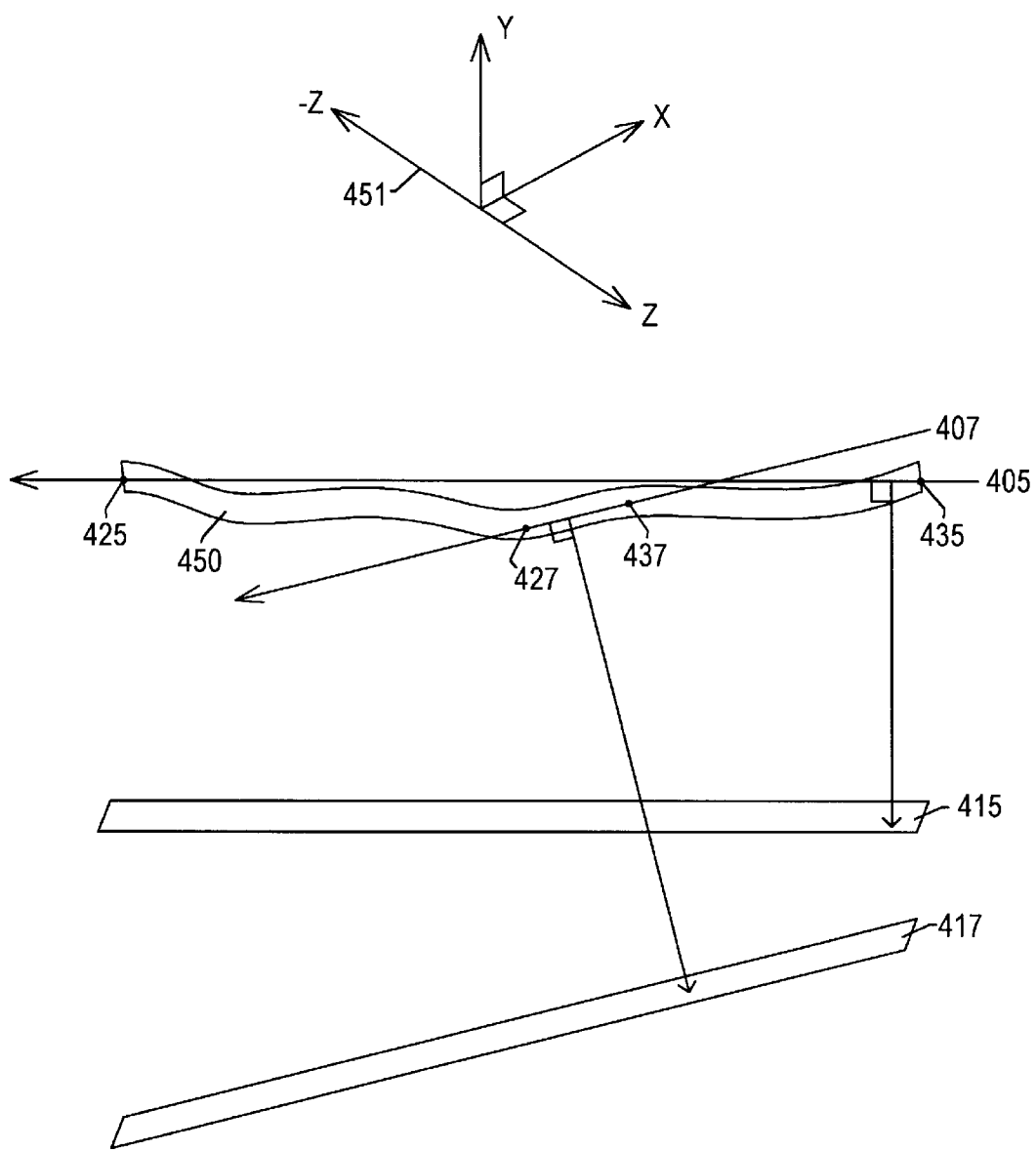
FIG. 4 is a diagram illustrating selection of projection planes for different portions of a well-bore according to one embodiment of the present invention.

Referring next to FIG. 4, selection of a projection plane will be discussed according to various embodiments of the present invention. As mentioned earlier, not all embodiments of the present invention employ a projection plane. However, the following discussion describes at least two different ways of choosing a projection plane for those embodiments that employ one. To aid in understanding FIG. 4, it may help to consider well-bore 450 in conjunction with reference system 451, which is a right hand reference system having an x axis and y axis perpendicular to each other and lying in the plane of the surface of the page. The z axis is normal to the plane in which the x axis and y axis lie. Well-bore 450 is drilled generally in the negative z direction, but deviates from the z direction in both the negative x and negative y directions. Note that the magnitude of deviation from the z axis is often referred to as the inclination, and the direction of the deviation in the x and y direction is usually known as the well azimuth.

When a well is deviated primarily along a single axis, it may be advantageous to choose a projection plane, such as plane 415, that is roughly parallel to the entire length of the well-bore. One way of choosing such a projection plane would be to select a first point near the top of well-bore 450, such as top point 435, and another point near the bottom of well-bore 450 such as bottom point 425. In one embodiment, bottom point 425 is a known point near the bottom of an already drilled well. In other embodiments, bottom point 425 is a target point towards which a well is to be drilled.

Once the two points are selected, line 405, is drawn between them. Line 405 illustrates a line that is roughly parallel to the entire length of well-bore 450, and will be one of the lines used to define the projection plane. A second line (not illustrated) can be drawn parallel to the z axis, which in at least one embodiment is the primary axis along which the well is drilled. Line 405 and the second line (not illustrated) are then used to define a projection plane, such as plane 415, onto which the entire length of well-bore 450 can be projected.

However, as noted earlier, well-bore 450 deviates along more than one axis, and the amount of deviation in any particular direction (the well azimuth) is not constant throughout the length of the well-bore. Consequently, it may be desirable to define a projection plane, such as plane 417, for each particular section of well-bore 450.

Projection plane 417 may be defined in a manner similar to that used to define plane 415, except that instead of using top point 435 and bottom point 425 to generate a line roughly parallel to the entire length of well-bore 450, upper point 437 and lower point 427 could be used to define a line, such as line 407, which is roughly parallel to only a portion of well-bore 450. As in the previous example, a second line (not illustrated) can be drawn parallel to the z axis. Line 407 and the second line can then be used to define a projection plane, such as plane 417, that is parallel to a particular section well-bore 450. Plane 417 can then be used for projection of an appropriate section of well-bore 450.

It will be appreciated that these two examples are not all inclusive. For example, various statistical and/or best fit methods may be used to define one of the lines to be included in the projection plane. In other examples, a projection plane maybe chosen to include to a line parallel to the inclination/deviation at a midpoint of well-bore 450, the inclination/deviation at the top or bottom of a desired section of well-bore 450, the maximum or minimum inclination/deviation of a particular section of well-bore 450, a moving average of inclination/deviation across the section of well-bore 450 being considered, and the like. Additionally, the second line used to define a projection plane need not be parallel to the z axis; instead another suitable axis may be chosen as desired. Also, while the z axis in reference system 451 as discussed above generally corresponds to a vertical axis, no such limitation is required in practicing the present invention. The reference system may be adapted as desired. It will also be appreciated that although only two projection planes are discussed in FIG. 4, more or fewer than two projection planes can be used for different well-bore sections as desired.

Figure 5:
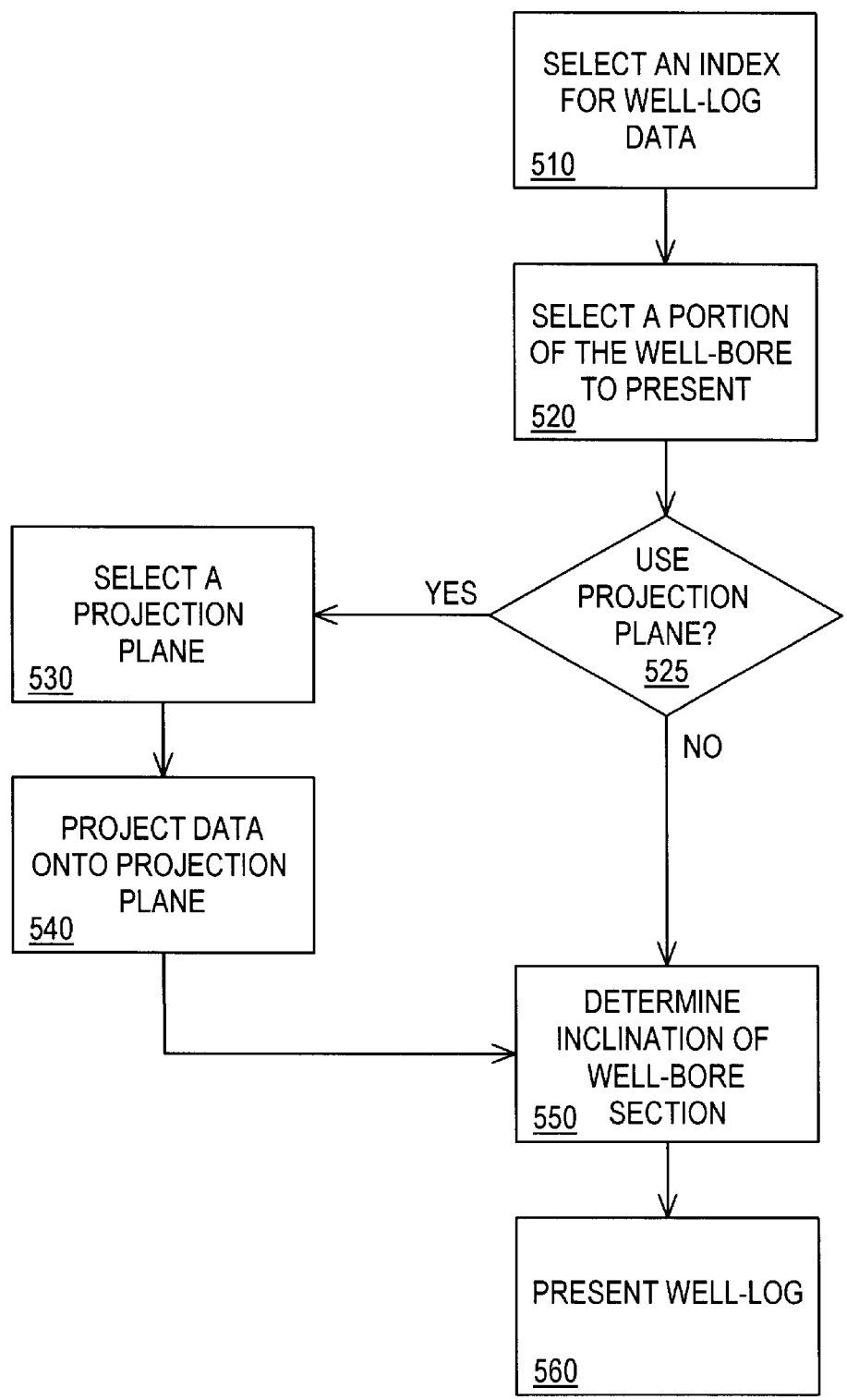
FIG. 5 is a flow diagram illustrating the steps of a method for displaying well-logging data according to one embodiment of the present invention.

Referring now to FIG. 5, a method according to an embodiment of the present invention will be discussed. The illustrated method begins by selecting an index for well-log data in step 510. In most cases the index will be a depth measurement such as pipe depth, cable depth, true vertical depth, or the like. If a depth index is selected, a user may further select a scale, so that for example 100 feet of well depth may be presented over 10 inches of the well-log. Other indices and scales may be chosen without departing from the teachings set forth herein.

The method proceeds to step 520, where a portion of the well-bore is selected for presentation. If, for example, a pre-recorded data file such as a tubing conveyed instrument file, a logging-while-drilling file, an interpretation file, a well modeling file, a drilling survey or data from a previous logging run is used to produce a well diagram such as those illustrated in FIGS. 1 and 2, then a user may select the portion of the well-bore to be presented in the well-log by interactive input associated with the well diagram. If, however, no pre-recorded data file exists and the well-log display is to be constructed using deviation/inclination data gathered in "real time," then the section of the well-log to be presented may be selected automatically or manually as the inclination data becomes available for each section.

In step 525, the decision whether or not to use a projection plane for the well-log presentation is made. For example, if a two or three dimensional display such as those shown in FIGS. 1 and 2 is to be used, some embodiments display a representation of the well-bore projected onto a plane, while others display the well-bore representation directly from inclination/deviation and azimuth information. This selection may be made for the user automatically, or the user may manually choose whether to use a projection plane.

If the decision to use a projection plane is made in step 525, then a projection plane is selected in step 530. The projection plane may be selected according to the methods discussed with reference to FIG. 4, or another suitable method. Recall that either a single projection plane may be chosen, for example when a well-bore deviates significantly in only one plane or when the sections of interest have about the same azimuth, or a projection plane may be chosen, either automatically or manually, for various sections of the well-bore.

Once a projection plane has been chosen for a particular section of the well-bore, step 540 is performed. In step 540, the data to be displayed on the well-log is projected onto the projection plane determined in step 530 using various methods of projecting data onto a plane known to those skilled in the art. As noted earlier, the data to be projected onto the projection plane can be acquired in advance and saved to a data file, or the information can be gathered "real time" so that the well-log and/or well diagram may be constructed during acquisition of the data. Various combinations of pre-recorded and "real time" data may be used as desired.

Following step 540, the inclination of the well-bore section to be presented in the well-log is determined in step 550. In at least one embodiment, the angle at which the well-log is displayed in step 560 may be controlled by a data field that includes inclination/deviation data corresponding to measured points in the well-bore. The inclination/deviation data may have been gathered from a well survey or various borehole measurement tools such as logging-while-drilling tools, wireline-logging tools, tubing conveyed tools, measurement-while-drilling tools, and the like. The inclination of the well-bore may be directly stored in this data field, or the inclination/deviation can be mathematically determined from measurement data in this field using principles similar to those described in FIG. 4 for choosing a projection plane. For example, the inclination information from each measured point of a section of well-bore can be averaged, and that average can be used as the angle of the primary axis of the well-log. Alternatively, a least-squares minimum or other "best fit" method can be applied to the inclination measurements over a section of the well-bore, and the primary axis of the well-log can be matched to the result. Other alternatives include using the inclination at the highest point, lowest point or midpoint of the section of interest.

In other embodiments, the primary axis of adjacent sections of the well-log are dependent on each other. For example, if a first section of log is determined to have a primary axis of 23 degrees based on the deviation at the midpoint of the section, and the subsequent section of the well-log is to be presented at 19 degrees based on the deviation at the midpoint of that section, then both sections of log may be presented at 21 degrees, in order to avoid a "jump" in the primary axis between well-log sections. Alternatively, one may use linear interpolation to choose angles during a transition from one well-log section to another.

Finally, the well-log is presented at an angle corresponding to the deviation/inclination of the well-bore in step 560. The well-log may be presented using the same steps as those used in presenting a vertical well-log, except that once a section of well-log has been readied for display the primary axis of the log is transformed to match the inclination of the well-bore. For example, a vertical well log is typically constructed using data from a description file, which normally includes display information such as the number of tracks to be displayed, whether each track is to be presented in a logarithmic or linear format, the desired data curves to be displayed in each track of the well-log, the color, weight and type (e.g. solid, dashed, etc.) of lines used for each data curve, and similar information. This information is then fed to a graphics rendering programs to generate and render the vertical log. Once the vertical well-log has been constructed, it can be stored in an "off-screen" buffer, and then an appropriate rotational transform can be applied on a pixel by pixel basis to rotate the "off-screen" image by the desired angle. Various rotational transforms are available from any number of commercially available graphics packages.

Rather than first drawing a vertical log and then rotating the log, a coordinate transform can be introduced into the graphics pipeline before drawing the log using a graphics package such as OpenGL. The transform puts the horizontal and vertical center of the current log section at the 0,0 coordinate and then a rotation transform rotates the log by the desired deviation amount. The graphics package may be a two-dimensional graphics package, a three-dimensional graphics package operating in a two dimensional mode, or any other suitable type of graphics package. It will be appreciated that in addition to the methods already described, those skilled in the art could draw the log on a pixel-by-pixel basis without the use of a separate graphics package.

In at least one embodiment, the entire well is viewed using a series of discrete sections, with each section having a primary axis that might bear no relation to the primary axis of previous or subsequent log sections. In such a case, a first section of the well-log may be presented at an angle of, for example, 20 degrees from vertical. An adjacent section of the well-log may be displayed at an angle of 25 degrees from vertical, and the two well-log sections may not "fit together."

In other embodiments, however, rather than presenting the well-log as a series of discrete sections, the well-log may be presented in a continuous manner, such that a user may scroll to view different sections of the well log using various interactive input techniques. When the well-log is to be presented in a continuous manner, it may be desirable, to select a primary axis for each log section that avoids "jumps" between log sections when possible, as discussed with regard to step 550.

In at least one embodiment, the well-log is displayed on an information handling system, such as a desktop computer, a laptop computer, a personal digital assistant, or the like. In such a case the well-log may be presented with or without an accompanying well diagram, and either in discrete sections having discrete primary axes, or in a scrolling section in which the primary axis is altered as different portions of the well-bore are displayed in the well-log. In another embodiment, the well-log is presented in hardcopy form either with or without the accompanying well diagram. It should also be noted that the content of the well log and/or accompanying well diagram are by no means limited to two dimensional curve/line displays, but instead the teachings set forth herein may be used to present a well-log using 3 dimensional images.

The steps illustrated in FIG. 5 are shown and discussed in a sequential order. However, the illustrated method is of a nature wherein some or all of the steps may be continuously performed or performed in a different order. In addition, some steps may be omitted in various embodiments, and certain implicit steps may not be illustrated.

Figure 6:
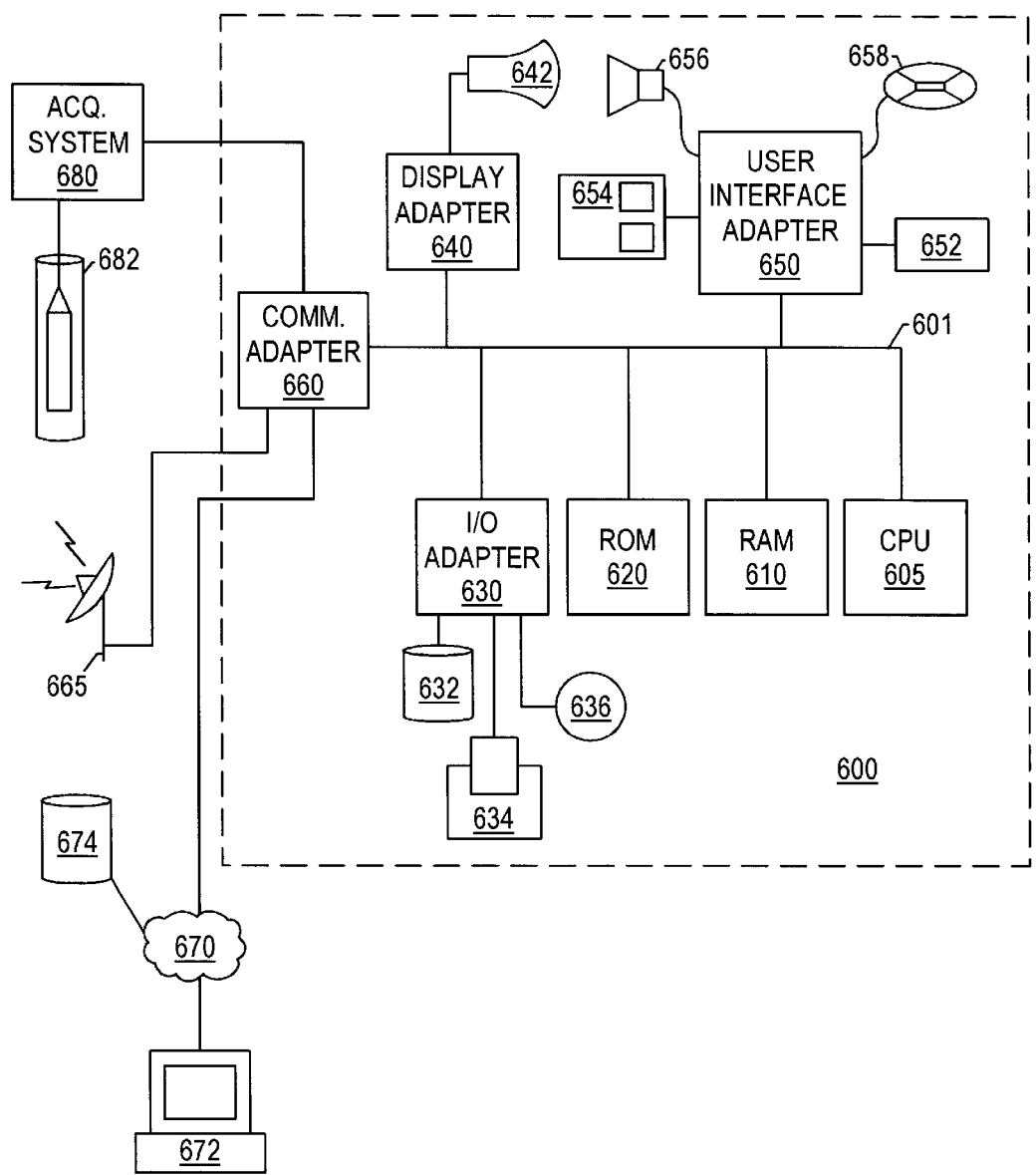
FIG. 6 is a block diagram of one embodiment of an information handling system suitable for use with various embodiments of the present invention.

Referring next to FIG. 6, an information handling system suitable for use with various embodiments of the present invention will be discussed. In at least one embodiment, information handling system 600 comprises central processing unit (CPU) 605, random access memory (RAM) 610 and read-only memory (ROM) 620. RAM 610 can be, for example static RAM (SRAM), synchronous dynamic RAM (SDRAM) or another suitable type of RAM. ROM 620 could also be erasable programmable read-only memory (EPROM), electrically erasable programmable read-only memory (EEPROM), or the like. Information handling system 600 further includes input/output (I/O) adapter 630 for connecting peripheral devices such as disk units 632 which may include compact disk drives (CDs), floppy drives, removable or fixed hard drives and the like, and tape drives 636, both of which are capable of storing data to be processed, and printers 634 to system bus 601; a user interface adapter 650 for connecting peripherals such as keyboard 652, mouse 654, speaker 656, microphone 658, and/or other user interface devices to system bus 601; and communications adapter 660 for connecting information handling system 600 to an information network 670 such as the Internet, satellite communications system 665, or an acquisition system 680. Communications adapter 660 may be configured to use various communications protocols, such as ethernet, fiber-distributed data interface (FDDI), token ring, transmission control protocol/Internet protocol (TCP/IP) etc. Information handling system 600 further includes display adapter 640 for connecting a display device such as monitor 642. It will be understood that information handling system 600 may include other suitable data processing systems without departing from the scope of the present invention.

Acquisition system 680 is used primarily to acquire measurement data from well-bore measurement tools 682. This measurement data may include inclinometry data such as that recorded from wireline tools such as a dipmeter or a formation imaging tool, and measurements from other tools. The data recorded using measurement tools 682 can be provided to information handling system 600 via communications adapter 660 for processing and display of a well-log presentation as taught herein, or the information can be delivered, via communications adapter 660 and information network 670 to client system 672 for processing and display of a well-log presentation. Client system 672 may include work stations, desk top computers, and the like. Information handling system 600 may also access pre-recorded measurement and/or inclination data from database 674, via information network 670.

One of the preferred implementations of the invention is a set of computer readable instructions to be executed on one or more processing systems. Until required by information handling system 600, the set of instructions may be stored in another computer readable memory, for example, in a hard disk drive or in a removable memory such as an optical disk for eventual use in a CD drive or DVD drive or a floppy disk for eventual use in a floppy disk drive. Further, the set of instructions can be stored in the memory of another processing system and transmitted over a local area network or a wide area network, such as the Internet, where the transmitted signal could be a signal propagated through a medium such as an ISDN line, or the signal may be propagated through an air medium and received by a local satellite to be transferred to processing system 600. Such a signal may be a composite signal comprising a carrier signal, and contained within the carrier signal is the desired information containing at least one computer program instruction implementing the invention, and may be downloaded as such when desired by the user. One skilled in the art would appreciate that the physical storage and/or transfer of the sets of instructions physically changes the medium upon which it is stored electrically, magnetically, or chemically so that the medium carries computer readable information.

In the preceding detailed description of the figures, reference has been made to the accompanying drawings which form a part thereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be constructed by those skilled in the art. Accordingly, the present disclosure is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present disclosure is defined only by the appended claims.

What is claimed is:

1. A method of displaying well-logging data, the method comprising the steps of:

determining a deviation of a section of a well-bore; and presenting a well-log of the section of the well-bore, the well-log having an index track, at least one data track, and a principle axis matched to the deviation of the section of the well-bore.

2. The method as in claim 1, further including the steps of:

obtaining user input; and selecting the principle axis of the well-log based on the user input.

3. The method as in claim 1, further including the steps of:

obtaining deviation information from a data file; and determining the deviation based at least in part on the information from the data file.

4. The method as in claim 3, wherein the data file is selected from the group consisting of a drilling survey, a wireline log file, a tubing conveyed instrument file, a logging-while-drilling file, a measurement-while-drilling file, an interpretation file, and a well modeling file.

5. The method as in claim 1, further including the steps of:

obtaining deviation information as the deviation information is acquired; and determining the deviation of the section of the well-bore based at least in part on the deviation information obtained during acquisition.

6. The method as in claim 1, wherein the step of presenting the well-log includes the steps of:

displaying the well-log on a screen;

obtaining user input associated with the displayed well-log; and altering the display based on the user input.

7. The method as in claim 6, further including the steps of:

displaying a well diagram on the screen; and emphasizing a portion of the well diagram corresponding to the section of the well-bore displayed in the well-log.

8. The method as in claim 7, further including the steps of:

altering, based at least in part on the user input, the portion of the well diagram emphasized; and altering the well-log to display the section of the well-bore corresponding to the emphasized portion of the diagram.

9. The method as in claim 1, wherein the step of determining a deviation includes the step of projecting the section of the well-bore onto a projection plane.

10. The method as in claim 9, wherein the step of projecting the section of the well-bore onto a projection plane includes determining an orientation of the projection plane based on a vector drawn from a first point in the well-bore to a second point in the well-bore.

11. A computer readable medium tangibly embodying a program of instructions, said program of instructions including instructions to:

determine a deviation of a section of a well-bore; and present a well-log of the section of the well-bore, the well-log having an index track, at least one data track and a principle axis matched to the deviation of the section of the well-bore.

12. The computer readable medium as in claim 11, wherein said program of instructions further includes instructions to:

obtain user input; and select the principle axis of the well-log based on the user input.

13. The computer readable medium as in claim 11, wherein said program of instructions further includes instructions to:

obtain deviation information from a data file; and determine the deviation based at least in part on the information from the data file.

14. The computer readable medium as in claim 13, wherein the data file is selected from the group consisting of: a drilling survey, a wireline log file, a tubing conveyed instrument file, a logging-while-drilling file, a measurement-while-drilling file, an interpretation file, and a well modeling file.

15. The computer readable medium as in claim 11, wherein said program of instructions further includes instructions to:

obtain deviation information as the deviation information is acquired; and determine the deviation based at least in part on the information obtained during acquisition.

16. The computer readable medium as in claim 11, wherein said instructions to present a well-log include instructions to;

display the well-log on a screen;

obtain user input associated with the displayed well-log; and alter the displayed well-log based on the user input.

17. The computer readable medium as in claim 16, wherein said program of instructions further includes instructions to:

display a well diagram on the screen; and emphasize a portion of the well diagram corresponding to the section of the well-bore displayed in the well-log.

18. The computer readable medium as in claim 17, wherein said program of instructions further includes instructions to:

alter, based at least in part on the user input, the portion of the well diagram emphasized; and alter the well-log such that the section of the well-bore corresponding to the emphasized portion of the diagram is displayed.

19. The computer readable medium as in claim 11, wherein said instructions to determine a deviation of the well-bore include instructions to project the section of the well-bore onto a projection plane.

20. The computer readable medium as in claim 19, wherein said instructions to project the section of the well-bore onto the projection plane include instructions to determine an orientation of the projection plane based on a vector drawn from a first point in the well-bore to a second point in the well-bore.

\* \* \* \* \*